United States Patent [19]
Williams

[11] 3,889,610
[45] June 17, 1975

[54] COMPACT ROTARY-HOUSING INCINERATOR AND STEAM GENERATOR

[76] Inventor: Cecil E. Williams, 274 Opihikao Way, Honolulu, Hawaii 96825

[22] Filed: July 20, 1973

[21] Appl. No.: 381,262

[52] U.S. Cl. .................. 110/10; 110/14; 110/15
[51] Int. Cl. ............................................. F23g 5/06
[58] Field of Search .......... 122/11; 110/8 R, 10, 14, 110/15

[56] References Cited
UNITED STATES PATENTS

| | | |
|---|---|---|
| 2,484,161 | 10/1949 | Fulton .................................. 122/11 |
| 3,317,202 | 5/1967 | Cates, Jr. et al. ..................... 110/15 |
| 3,380,407 | 4/1968 | Nilsson ................................ 110/14 |
| 3,487,792 | 1/1970 | Dixon et al. ....................... 110/14 X |
| 3,769,921 | 11/1973 | McMullen ............................ 110/15 |

Primary Examiner—Kenneth W. Sprague
Attorney, Agent, or Firm—James C. Wray

[57] ABSTRACT

A rotary-housing incinerator adapted for shipboard use has a cylindrical casing which is rotated to distribute heat and to scrape deposits from its inside walls. Elements are cantilevered from one end within the casing. Milled refuse is fed through oxygen-deprived, vented, preheating conveyors. Hot, sterile, milled refuse is pneumatically and magnetically sorted and is moved to a bin where it contacts the rotating casing wall. The refuse is dispensed to an oscillating grating, is contacted with air, and is ignited. Ash is conveyed from a remote end of the grating. Hot combustion-product gases flow through refuse preheaters, steam generators and air and water preheaters before being inducted through cleaning means.

7 Claims, 4 Drawing Figures

PATENTED JUN 17 1975 3,889,610

SHEET 3

COMPACT ROTARY-HOUSING INCINERATOR AND STEAM GENERATOR

BACKGROUND OF THE INVENTION

This invention relates generally to equipment for disposing of municipal refuse by burning under controlled conditions. Land for refuse disposal or incinerator sites is difficult to obtain in urban coastal areas, and it becomes necessary to consider utilizing the ocean for this purpose. Properly designed incinerators mounted on special-purpose ships will permit safe and relatively efficient disposal of refuse.

Many types of incinerators and waste destructors have been designed for use on land, but these are not well adapted for shipboard use. An incinerator on shipboard must be compact, reliable, maintainable, and have a long service life. Wave action must not degrade its performance. Sufficient energy should be recovered from the incineration process to supply all power and propulsive needs of the ship and waste processing equipment. Refuse collected in the United States frequently has an energy content approaching 5000 BTU per pound, partly as a result of the high paper content. Refuse collected in other parts of the world often contains less paper, more garbage, more inert matter and more moisture than that collected in the United States. The net result is a heating value of less than 2000 BTU per pound with increased difficulty in burning the refuse in an incinerator. Conventional incinerators with a capacity for burning more than 200 tons of refuse per day often utilize chain grates or reciprocating stokers to carry the refuse from a feed hopper at one end of the furnace through the fire bed to the ash receiver. A large part of the furnace length is required to dry the refuse and heat it all to the ignition temperature.

SUMMARY OF THE INVENTION

In accordance with the present invention there is provided apparatus for processing and burning municipal and similar refuse with recovery of energy from the combustion thereof. This apparatus is arranged for installation on shipboard but is also applicable to use on land when adequate cooling water is available. A compact incinerator and steam boiler are mounted so that they may be enclosed in a single housing or shell constructed as a cylinder with one open end and one closed end. This cylindrical housing is equipped with a bearing at the center of the closed end and support rollers outside the circumference near the open end, so that the housing may be rotated slowly about the axis of the cylinder with the axis of the cylinder oriented in a generally horizontal position.

Cooling-water sprays external to the cylindrical housing are provided to maintain a housing temperature between 300°F and 800°F for low-carbon steel construction. The upper limit of temperature is set by the metallurgical properties of low-carbon steel. The lower limit is established by the dew point of the furnace gases and by corrosion considerations.

Rotation of the cylindrical housing or shell simplifies cooling and temperature control, distributes the internal wear and oxidation more evenly, permits inspection of all parts, assists in the feeding of refuse and in the removing of ash, and retards the buildup of deposits of slag or other residue. No refractory lining is used, which saves weight and bulk.

In one embodiment a cylindrical housing has a radius approximately equal to the axial length of the cylinder. The ratio of internal volume to surface area is much higher for the cylindrical construction than for the conventional rectangular construction, which reduces the heat losses through the walls.

All internal parts of the incinerator and boiler are supported by a cantilevered structure through an essentially flat stationary wall at the open end of the rotating cylinder. In one embodiment support for the free end of the cantilever is provided through a hollow bearing support in the center of the closed end of the cylinder. Combustion grates of a reciprocating type are positioned as an inclined plane parallel to the axis and in the lower half of the cylinder. In the preferred shipboard orientation the axis of the cylindrical housing or shell is parallel to the length of the incinerator ship. Rolling of the ship aids the reciprocating grate action, and is compensated for by controlling the frequency and amplitude of the reciprocating motion.

A method of operating an incinerator-ship system is described. The incinerator ship moves continuously in deep water over a preselected route, beyond the sight of land. Refuse collected on land is transported by barge or special ship to the incinerator ship for processing. The incinerator ship obtains all power for its operation by energy recovery from the combustion of the refuse. After transfer to the incinerator ship the refuse is ground by a mill to pieces smaller than a three-inch cube and is placed in storage bins heated by exhaust gases.

Conveyors then pass the refuse through large drying tubes located inside the rotating cylindrical housing of the incinerator. Although the exterior of these drying tubes is directly exposed to the combustion gases, the refuse is dried without ignition because the oxygen content of the gases in contact with the hot refuse is kept too low for ignition. The atmosphere in the drying tubes consists primarily of steam and other gases evolved from the heated refuse, but hot flue gas (very low in $O_2$ content) is added as necessary to prevent ignition, even though drying temperatures are expected to exceed 300°F. Openings in these dryer tubes permit any excess gas evolved to exit directly into the incinerator.

Dried and sterile refuse is then removed from the furnace and is separated by screening and air flotation. Iron is removed by a magnetic separator. Most of the glass, dirt, and other non-combustible material is removed and discarded at this point, without passing it over the combustion grates of the incinerator. The combustible portion (now approximately half of the weight and bulk of the original refuse from land) is then conveyed into a feed hopper located inside the incinerator. After passing through a water tube boiler, combustion gases are cooled and washed by water sprays to remove particulate matter.

It is an object of the present invention to provide a compact refuse incineration system for use on specially-constructed ships.

It is a further object of the present invention to provide apparatus capable of incinerating municipal refuse with high ash and moisture content and correspondingly low energy content.

Another object of this present invention is to provide a means of drying the refuse in the incinerator under conditions which prevent combustion but permit moisture and gases evolving from the heated refuse to directly enter the furnace and mix with hot gases resulting from combustion on the grates.

A still further object of this invention is the provision for removal of inert material from the dried refuse before it is placed upon the combustion grates.

One object of the invention is the provision of an incinerator having a rotating external shell for purposes of heat transfer and, with external water sprays, for temperature control.

Provision of a rotation external shell to house an incinerator and associated boiler equipment is another object of the invention.

This invention has as another object the provision of a method for the use of dried refuse in the feed bin and the scraping action of the ash slide for the purpose of continuously cleaning deposits from the walls of the furnace or incinerator.

Another object of the invention is the provision for drying and reducing the volume of refuse fuel inside the incinerator under conditions which prevent combustion of the solid materials while permitting all evolved vapors or gases to directly mix with the gases inside the incinerator.

A further object of the invention is the provision of a system of synchronizing the incinerator grate feed oscillations to the roll of the ship with the object of controlling feed rates in incinerator ships.

Another object of the invention is the provision of a procedure of drying and sterilizing the refuse fuel in the incinerator, and then removing the inert residue before passing the dried refuse over the combustion grates of the incinerator.

The invention has as another object the provision of a compact incinerator for handling moist, low-heat-content refuse with a minimum of external heat loss.

These and other objects and features of the invention are apparent in the disclosure, which includes the specification with the forgoing and ongoing description and the claims, and which includes the drawings.

DETAILED DESCRIPTION OF THE DRAWINGS

Figure 1:
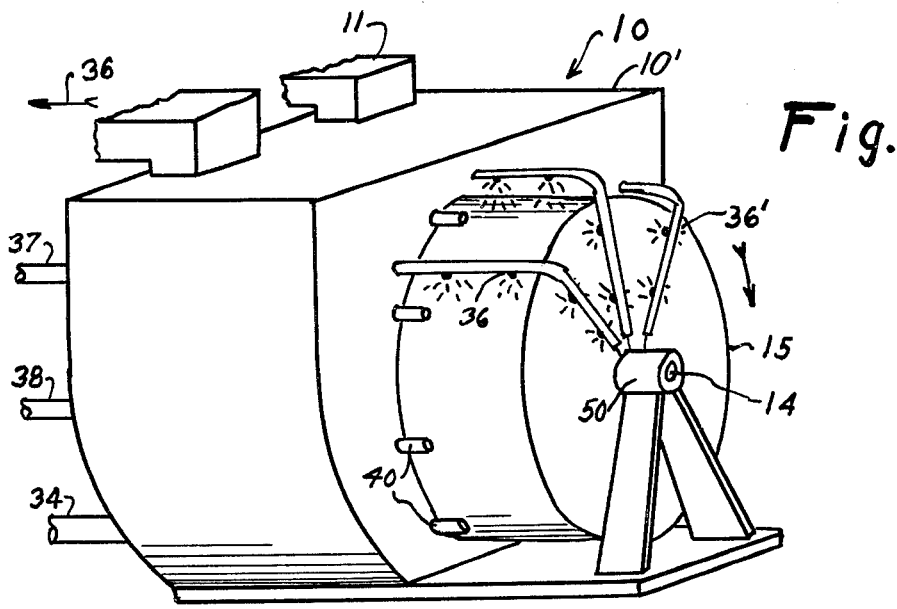
FIG. 1 shows a schematic view of a rotary-housing incinerator with external cooling sprays and associated stationary equipment.
Figure 2:
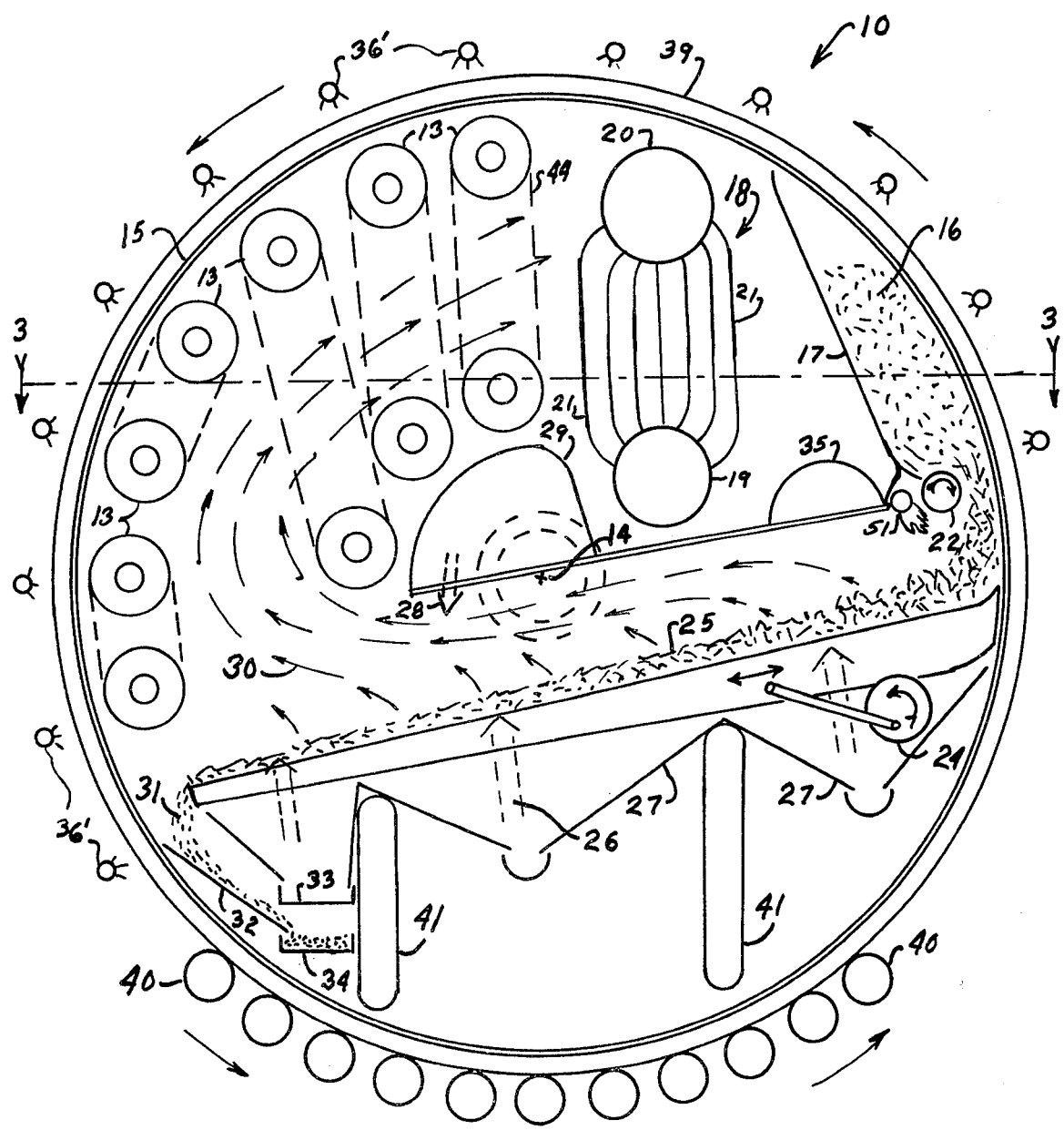
FIG. 2 is a schematic detail in a vertical plane of an internal arrangement of parts inside the rotary-housing incinerator of FIG. 1 as viewed from the open end when facing the closed end.
Figure 3:
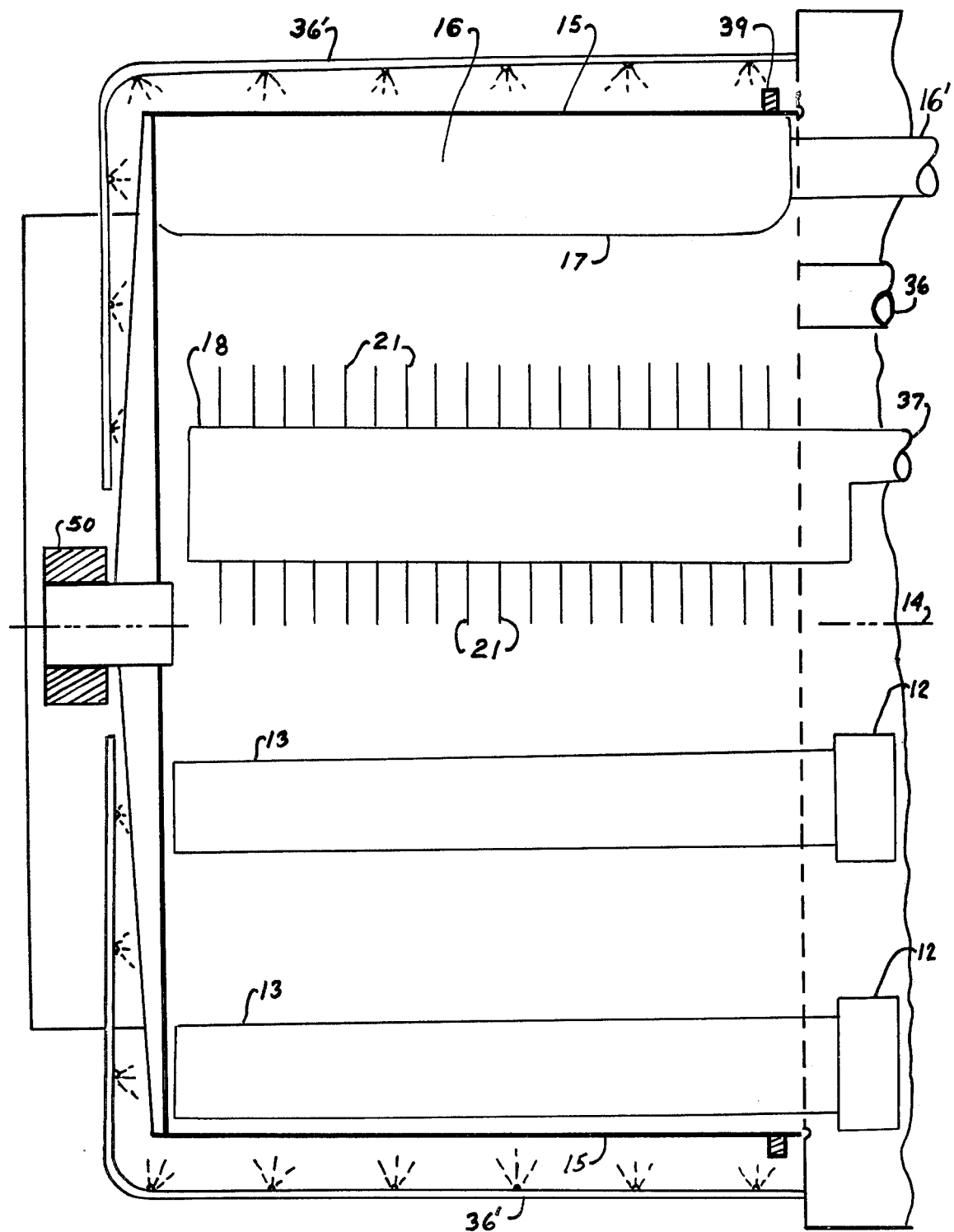
FIG. 3 shows a view across the rotary-housing interior in a horizontal plane parallel to the axis of rotation.

Referring now to the drawings like elements are designated by the same reference characters. FIGS. 1, 2, and 3 illustrate a rotary-housing incinerator 10 arranged in a compact package for shipboard use.

Raw refuse enters stationary unit 10' through the feed channel 11. A hammer mill grinds the refuse to pass through a three-inch opening. This ground refuse then enters the feed channel 11. A distribution conveyor 11A apportions the ground refuse among the feed tubes 11B leading into the hoppers 12 of the individual drying conveyors 13. Each drying conveyor 13 conveys the refuse into and out of the incinerator in a path generally parallel to the axis of rotation 14 of the rotating housing 15. After drying, the refuse is sifted and inert materials are removed. The refuse is conveyed by a conveyor 16' to a feed bin 16 located inside the incinerator 10. The feed bin 16 extends for the full axial length of the rotating housing 15. The outer wall of the feed bin 16 is the rotating housing 15, which moves generally upward in this region. The inner side 17 of this feed bin 16 forms the wall of the chamber containing the water-tube boiler 18. This boiler has a lower water drum 19 connected to the top steam drum 20 by boiler tubes 21 which receive heat energy from the hot combustion gases 30.

Heated and dried refuse is removed from the feed bin 16 at a controlled rate by feed roller 22 and is dropped onto an oscillating grate structure 23. A rocker control 24 produces the desired amplitude and frequency of operation to keep the burning refuse 25 progressing down the grate 23. Underfire air 26 is supplied through plenum chambers 27 located beneath the grate. Overfire air 28 supplied from the air preheating chamber 29 located in the top of the combustion are mixes with the combustion gases 30. Ashes 31 drop over the end of the grate 23 and tumble down a slide 32 into an endless ash conveyor whose upper section 33 moves into the rotating housing 15 and whose lower section 34 carries the ashes out of the rotating housing.

Hot combustion gases 30 transfer heat to the refuse drying conveyors 13, the steam boiler 18, the refuse feed bin 16, the air heating chamber 29, the water-heating chamber 35, and the rotating housing 15 as they are exhausted through port 36 by an induced-draft fan. Induced draft maintains the ambient pressure inside the rotating housing 15 at slightly below outside atmospheric pressure. This prevents gas leakage from the furnace through moving joints.

Water sprays 36' are positioned to maintain the exterior of the rotating housing 15 at a suitable operating temperature. Steam from the boiler 18 supplies power to operate the ship through steam line 38, and then is passed through the feed-water heater 35 before being pumped into the water drum 19 of the boiler.

The size of the rotating housing 15 is such that it is desirable to fabricate it in a number of detachable segments. This makes it easier to manufacture, ship, assemble, and inspect the housing. Over one-half of the weight of the rotating housing 15 is carried by a suitable center bearing 50 positioned at the closed end of the cylinder. The housing stiffening ring 39, shown in FIG. 2 rides upon support rollers 40. The lower cantilever supports 41 extend through the furnace to support the stationary lower internal structures. Rotation of the housing 15 is produced by an electric motor and suitable reduction gears. Various combustion monitors, draft controls, observation ports, valves, and related hardware are omitted from the drawings for clarity and because they are of conventional design. An ignition burner 51 is mounted near the feed roller 22 for use in initial startup of the incinerator or in burning very low energy refuse.

Figure 4:
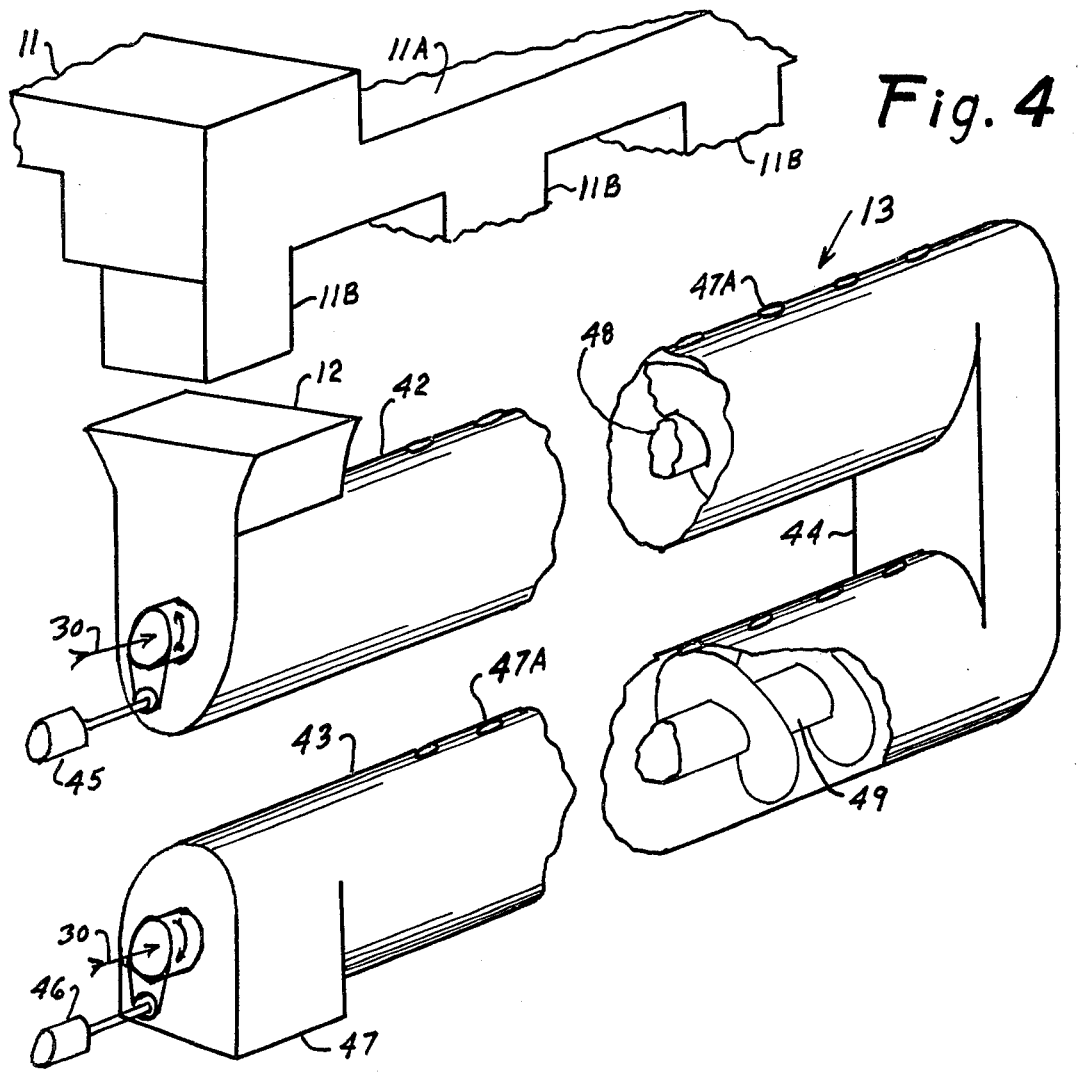
FIG. 4 shows the vented screw conveyor used to move the refuse into and out of the furnace for preheating the refuse without ignition.

FIG. 4 shows one embodiment of the refuse drying conveyor 13. Two separate rotary-screw conveyors 42, 43 are used with a gravity chute 44 to transfer the refuse from the top incoming tube to the lower outgoing tube of each pair. Each conveyor screw is driven by a separate electric motor 45, 46 at a suitable speed. Dry, hot refuse exits through the outlet 47 for further processing. The conveyors have rows of gas outlet holes 47A along their upper surfaces and the provision for supplying hot combustion gas 30 to the hollow center shafts 48, 49 of the conveyor screws. The outer surfaces of conveyor tubes 42 and 43 are heated with exhaust gases as shown in FIG. 2.

While the invention has been described with specific reference to a preferred embodiment, it will be obvious to those skilled in the art that the invention is not limited to that embodiment. Modifications and variations may be constructed without departing from the spirit and scope of the invention. The scope of the invention is defined in the following claims.

I claim:

1. Incinerator apparatus comprising a rotary cylindrical drum forming a combustion chamber, said drum having one open axial end and a closed second axial end, support means connected to the drum for rotatably supporting said drum, said support means including an axial bearing at the closed end, rotating means connected to the drum for rotating the drum, stationary housing means surrounding the open end of the drum, combusting means positioned within the drum for supporting combustible materials within the drum, feed means positioned within the drum for feeding combustible materials to the combusting means, air input means positioned within the drum for supplying air to combustible materials on the combusting means, ash removal means positioned within the drum for receiving ash from the combusting means and removing ash from the drum, and contilever means mounted in the housing and extending through the open end of the drum into the drum for supporting the feed means, combusting means, air input means and ash removal means within the drum, and gas withdrawal means connected to the housing for withdrawing combustion gas from the drum through the open end and from the housing.

2. The incinerator apparatus of claim 1 wherein the combusting means comprises inclined grating mounted for removing materials in a plane transverse to an axial direction of the cylindrical drum.

3. The incinerator apparatus of claim 1 wherein the feed means comprises a material holding partition forming a bin between a moving cylindrical wall of the cylindrical drum and said partition within the cylindrical drum and spaced from a wall thereof.

4. The incinerator apparatus of claim 3 wherein the feed means further comprises an opening at a lower end of the partition between the partition and rotating wall for dropping materials onto the combusting means.

5. The incinerator apparatus of claim 1 further comprising a partition overlying the combusting means for directing flow of combustion product gases across the cylindrical drum.

6. The incinerator apparatus of claim 1 further comprising a steam generating water drum, steam drum and interconnecting tubes mounted within the cylindrical drum.

7. The incinerator apparatus of claim 1 the feed means comprising a partition spaced from a rotating cylindrical wall of the drum for forming between the partition and the cylindrical wall a bin, whereby the rotating wall preheats and stirs materials within the bin, and discharge assist means mounted at a lower portion of the bin between the partition and the cylindrical wall for urging materials from the bin toward the combusting means, and wherein the combusting means comprises a sloped conveyor positioned in a plane generally transverse to an axis of rotation of the cylindrical drum for moving materials transversely across the drum, and the air input means comprising air plenum means mounted beneath the combusting means for forcing air up through the combustible materials on the combusting means, and air preheating means within the chamber for preheating air before air is flowed to the plenums, a source of air connected to the preheating means, and a partition positioned within the rotating chamber above the combusting means for controlling flow of gaseous combustion products across the rotating drum, and wherein the ash removal means comprises a continuous conveyor moving beneath a lower end of the combusting means for catching ash falling from the combusting means and conveying ash outward from the cylindrical drum in an axial direction, and further comprising steam generating means in the rotating drum for contacting hot gaseous combustion products and generating steam therefrom.

* * * * *